United States Patent
Donahue (10) Patent No.: US 9,504,300 B1
(45) Date of Patent: Nov. 29, 2016

(54) WEARABLE HANDS-FREE SUPPORT FOR MOBILE DEVICES

(71) Applicant: Donahue Designs, LLC, Bountiful, UT (US)

(72) Inventor: Nathan Donahue, Bountiful, UT (US)

(73) Assignee: Donahue Designs, LLC, Bountiful, UT (US)

( * ) Notice: Subject to any disclaimer, the term of this patent is extended or adjusted under 35 U.S.C. 154(b) by 239 days.

(21) Appl. No.: 14/317,794

(22) Filed: Jun. 27, 2014

Related U.S. Application Data (60) Provisional application No. 61/846,539, filed on Jul. 15, 2013.

(51) Int. Cl.
*A45C 11/00* (2006.01)

(52) U.S. Cl.
CPC .......... *A45C 11/00* (2013.01); *A45C 2011/002* (2013.01); *A45C 2011/003* (2013.01)

(58) Field of Classification Search
CPC .................. A45C 11/00; A45C 2011/003
See application file for complete search history.

(56) References Cited

U.S. PATENT DOCUMENTS

| | | | | |
|---|---|---|---|---|
| 3,690,525 A * | 9/1972 | Koons | ................... | B60N 2/286 224/155 |
| 4,582,165 A * | 4/1986 | Latini | ................... | A01M 31/02 108/152 |
| 4,836,938 A * | 6/1989 | Kobasic | ............... | A01M 31/006 224/153 |
| 5,332,283 A * | 7/1994 | Gray | ........................ | A47C 4/52 297/129 |
| 5,409,291 A * | 4/1995 | Lamb | ..................... | A01K 97/10 224/155 |
| 5,492,255 A * | 2/1996 | Gansky | ................. | A01M 31/02 224/153 |
| 5,607,089 A * | 3/1997 | Strum | ................... | A01M 31/02 224/155 |
| 5,642,846 A * | 7/1997 | Morrow | ..................... | A45F 4/00 224/576 |
| 5,954,391 A * | 9/1999 | Gray | ........................ | A47C 4/18 297/16.1 |
| 6,006,970 A | 12/1999 | Piatt | | |
| 6,135,557 A * | 10/2000 | Gustafsson | ............ | A47C 4/286 108/118 |
| 6,186,593 B1 * | 2/2001 | Garneau | ............... | A47B 83/008 248/464 |
| 6,349,864 B1 | 2/2002 | Lee | | |
| 7,681,855 B1 | 3/2010 | Cashman et al. | | |
| 7,780,049 B1 | 8/2010 | Baranoski | | |
| 8,104,655 B2 | 1/2012 | Zhang | | |
| 8,109,421 B2 | 2/2012 | McLean et al. | | |
| 8,267,294 B2 | 9/2012 | Yu et al. | | |
| 8,418,629 B2 | 4/2013 | Yu et al. | | |
| 2010/0025444 A1 * | 2/2010 | Tipton | ...................... | A45F 5/00 224/576 |
| 2010/0133303 A1 * | 6/2010 | Schilly | ...................... | A45F 3/10 224/155 |
| 2012/0061549 A1 | 3/2012 | Rogers | | |
| 2012/0280009 A1 | 11/2012 | Carroll et al. | | |
| 2013/0181024 A1 * | 7/2013 | Warner | .................. | F16M 11/26 224/576 |

* cited by examiner

*Primary Examiner* — Brian D Nash
(74) *Attorney, Agent, or Firm* — Christopher L. Wright; Snow Christensen & Martineau (57) ABSTRACT

The present invention provides a wearable adjustable support device for hands-free viewing of an object, such as a hand-held electronic device or book, comprising: an articulated bipod frame comprising a first support leg and a second support leg flexibly connected at the top; a support strap is connected to the lower portion of the first support leg, the lower portion of the second support leg, and the middle portion of the first support leg, wherein the support strap is adjustable in length; and a support configured to secure a viewable object to the upper portion of the first and second support legs.

25 Claims, 7 Drawing Sheets

WEARABLE HANDS-FREE SUPPORT FOR MOBILE DEVICES

FIELD OF INVENTION

The present invention relates to a wearable structure that provides a means of hands-free support for viewable objects, such as mobile devices, tablet computers, smart phones, e-book readers, books, and the like.

BACKGROUND

Personal electronic devices have become extremely popular, providing on-the-go entertainment and data access. Use of these devices may cause discomfort in a user's hands and arms when holding the device making the experience less enjoyable, while also further limiting the user's ability to perform tasks requiring use of the hands.

U.S. Pat No. 2012/0061549 to Rogers (2011) discloses an apparatus where the user's body supports a mobile electronic device. The apparatus consists of a platform with a lip at its bottom edge, a strap that connects to both sides of the platform that is to be worn around the neck, and optional support legs.

SUMMARY OF INVENTION

The present invention provides an improved simple, convenient, wearable structure for supporting mobile electronic devices for hands-free use. Further, the present invention is fully adjustable to accommodate a variety of users that can use the structure in various positions including, but not limited to, standing, sitting, and lying down.

In one aspect, the invention relates to a wearable adjustable support device for hands-free viewing of an object, such as a hand-held electronic device or book, comprising:

a frame comprising (i) a first support leg having an upper portion, middle portion, and a lower portion, and (ii) a second support leg having an upper portion and a lower portion, wherein the upper portion of the first support leg is connected to the upper portion of the second support leg, and wherein one or more of the middle/upper and lower portions of the support legs comprises a connection point;

a support strap connected to the lower portion of the first support leg, the lower portion of the second support leg, and the upper or middle portion of the first support leg; and a support configured to removeably support a viewable object on the frame.

In some embodiments, the frame is articulated and configured to allow an adjustable angle between the first and second support leg.

In some embodiments, the frame is a bipod frame.

In some embodiments, the support legs are adjustable in length.

In some embodiments, the support strap is adjustable in length.

In some embodiments, the support strap comprises a bottom portion, a middle portion and a top portion, wherein the support strap is adjustable in length, and wherein (i) the bottom portion of the support strap is connected to the lower portion of the first support leg, (ii) the middle portion of the support strap is slideably drawn through the second support leg connection point, and (iii) the top portion of the support strap is connected to the upper or middle portion of the first support leg, and wherein one or more of the top portion of the support strap and bottom portion of the support strap is adjustably connected to the first support leg via the connection point.

In some embodiments, one or more of the top portion of the support strap and bottom portion of the support strap is adjustably connected to the first support leg and the middle portion of the support strap is fixedly connected to the second support leg.

In other embodiments, both the top portion of the support strap and bottom portion of the support strap is adjustably connected to the first support leg.

In some embodiments, the first and second support legs are segmented. In other embodiments, the first and second support legs comprise folding segments attached with a hinge. In other embodiments, the first and second support legs comprise nested segments that are telescopic. In other embodiments the segmented first and second support legs are connected by an internal elastic cord.

In some embodiments, the position of the upper connection point on the first support leg is adjustable.

In yet other embodiments, the support strap comprises an adjustable strap tensioner configured to adjust the length of the support strap.

In some embodiments, the support strap is drawn through the connection point on the first support leg and reconnected to the support strap with an adjustable strap tensioner, wherein the adjustable strap tensioner is configured to adjust the length of the support strap.

In some embodiments, upper connection point is positioned at the upper or middle portion of the first support leg.

In other embodiments, the connection point is positioned at the lower portion of the first support leg.

In another aspect of the invention, the support strap comprises a bottom portion, a middle portion and a top portion, wherein the support strap is adjustable in length, and wherein (i) the bottom portion of the support strap is adjustably connected to the first support leg lower connection point, (ii) the middle portion of the support strap is connected to the second support leg, and (iii) the top portion of the support strap is adjustably connected to the first support leg upper connection point.

In some embodiments, the middle portion of the support strap is adjustably connected to the second support leg.

BRIEF DESCRIPTION OF DRAWINGS

Various embodiments of the present invention are shown and described in reference to the numbered drawings, wherein.

DESCRIPTION

The invention and accompanying drawings are discussed below, using reference numerals to identify parts and features, to enable one skilled in the art to practice the present invention. The drawings and descriptions are exemplary of various aspects of the invention and are not intended to limit or narrow the scope of the appended claims.

Figure 1A:
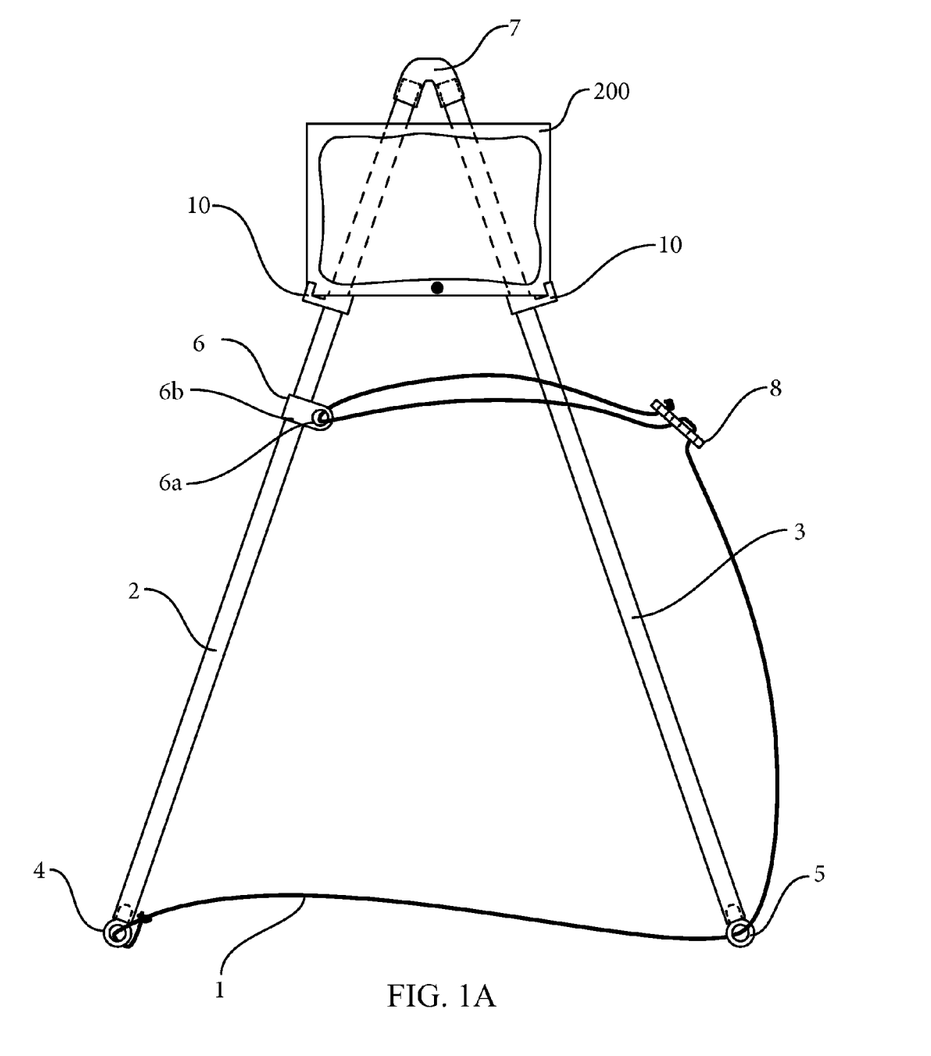
FIG. 1A illustrates a perspective view of one embodiment of the hands-free support device of the present invention, where the bottom portion of the support strap is fixedly connected to the lower portion of a first support leg, the middle portion of the support strap is slideably drawn through a connection point in the lower portion of the second support leg, and the top portion of the support strap is adjustably connected to the middle portion of the first support leg.

The device of the present invention is a wearable adjustable support device for hands-free viewing of an object, such as a hand-held electronic device, a book, or the like (referred to herein as a "viewable object"). One particular embodiment is shown in FIG. 1A, which shows an articulated bipod frame, comprising support legs 2 and 3, and having a support strap 1 configured to suspend the device on the body of a user 100, and supports 10 for securing a viewable object 200 to the support legs 2 and 3. When the support device is deployed on a user 100 (with the lower portions of the support legs 2 and 3 spread across the lap or torso of the user 100 and the support strap 1 extending around the back of the user 100 and reconnecting to a middle or upper portion of the support leg 2), the viewable object 200 is thereby supported on the body of the user 100 by means of the frame, such as a bipod frame, and the user 100 is able to view the object and/or interact with the object as one would ordinarily interact with a mobile device or a tablet device. FIG. 1A illustrates one particular embodiment, showing a device that comprises an articulated bipod frame comprising (i) a first support leg 2 having an upper portion, a middle portion, and a lower portion, and (ii) a second support leg 3 having an upper portion and a lower portion. A support strap 1 for securing the device to the body of a user 100 is connected to the lower portion of a first support leg 2, connected to the lower portion of a second support leg 3, and returned and connected to the middle portion of the first support leg 2. The support strap 1 is adjustable in length so as to vary the length of the support strap 1 between the lower portions of the two support legs 2 and 3 and the length of the support strap 1 extending from the second support leg 3 up to the middle or upper portion of the first support leg 2, thereby accommodating various sizes of users or permitting the device to be used in different positions, for example, while a user is standing, sitting, or lying prone on his/her back. It is understood that the arrangement of the support strap relative to the first and second support legs may be reversed.

As used herein, the term "connected" is used to refer to the support strap being "connected" to a support leg. It is intended that the term "connected," when not otherwise modified, means that the support strap is attached to or secured to the support leg either fixedly, adjustably, or slideably. A support strap that is fixedly attached is fixed to the support leg either permanently or temporarily, such that the support strap does not slip through any type of connection mechanism (such as a hole or other aperture). A support strap that is adjustably connected to a support leg can be adjustable by, for example, such means as the support strap slipping or sliding through a hole or aperture while the length of the support strap is adjusted by, for example, such means as a slip knot (i.e., a tautline hitch knot), a cord tensioner or a retractable reel. A support strap that is slideably connected to a support leg is configured so that the strap is freely slideable/moveable through the connection point.

In alternative embodiments, the upper portion of the first support leg 2 is connected to the upper portion of the second support leg 3 and configured to allow the first and second support legs 2 and 3 to be spread at an adjustable angle. For example, the first support leg 2 and the second support leg 3 may be flexibly connected at an upper portion of the support legs by means of a hinge 7 that allows the support legs 2 and 3 to be articulated and adjustably spread at any desirable angle. The hinge may comprise, for example, a mechanical hinge, such as a sectional barrel hinge having a hollow cylinder that rotates about a pivot. Alternatively, the hinge 7 may comprise a flexible material, such as a cloth or nylon strap, a plastic or rubber strap or tubing, or any other suitable means for allowing the two support legs 2 and 3 to be articulated. For example, in one particular embodiment shown in FIG. 1, the support legs are connected by means of a short piece of flexible plastic or rubber tubing connecting the top ends of the two support legs 2 and 3. In this embodiment, the upper ends of the support legs 2 and 3 may be inserted into the ends of the tubing, where they are held in place by friction between the plastic or rubber tubing and the support leg end, thus allowing the support legs 2 and 3 to flex about a hinge formed by the flexible tubing. By means of the flexible hinge 7, the first and second support legs may be spread wide to accommodate the body of a large user 100, or spread narrow to accommodate the body of a small user 100, or simply to adjust the device for a better fit and utility while the user is standing, sitting, or lying prone.

The support leg pieces 2 and 3 of the bipod structure are of sufficient rigidity to provide stability and support of the viewable object 200. The support legs 2 and 3 may be constructed of any material that is durable and rigid, sufficient to support the weight of a commercially available electronic mobile device, such as a smart phone or tablet device, or a book. For example, the support legs may be comprised of a shaft made of wood, plastic, fiberglass, carbon fiber, or lightweight metal, such as aluminum, titanium, or stainless steel. In some embodiments, the support legs 2 and 3 are segmented. In one particular embodiment, the frame pieces 2 and 3 are tubular and can collapse to a length less than their deployed length making the invention more adjustable and packable.

Figure 2A:
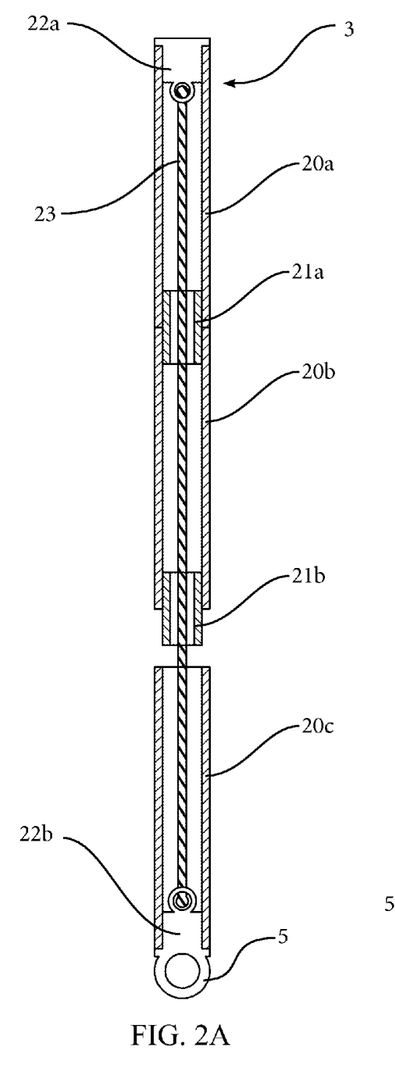
FIG. 2A shows an embodiment of a multi-segmented support leg comprising a series of tubular supports connected with an elastic cord tensioner.
Figure 2B:
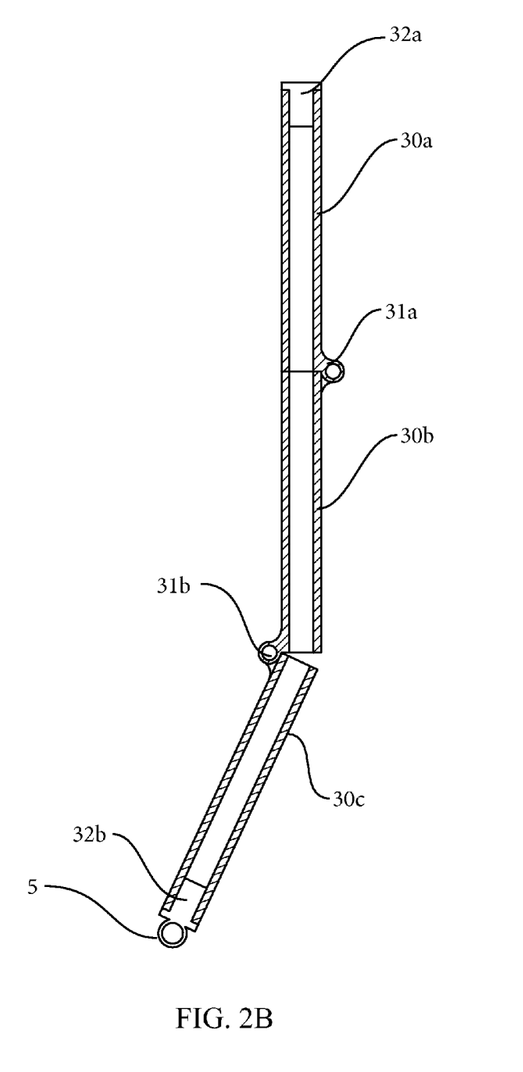
FIG. 2B shows an embodiment of a multi-segmented support leg configured to fold by means of hinges.

In some embodiments, support legs 2 and 3 are segmented. For example, as shown in FIG. 2A, a support leg may comprise a plurality of tubular segments 20a, 20b and 20c, with each segment being connected to its adjacent segment by means of an external (or internal) sleeve 21a and 21b that is placed within (or over) the end of the adjacent segment, to thereby provide rigidity to the tubular segments when assembled together. The tubular segments may be maintained in their assembled configuration, for example, by means of an internal elastic shock cord 23 that is internally attached to a plug 22b placed at the bottom end of support leg 2 and extends internally through the length of all segments of the tubing, and is then internally attached to a plug 22a at the top end of support leg 2. The internal elastic shock cord 23 is configured to provide sufficient tension that it maintains all segments of the support leg together when in use, but allows the segments to be pulled apart under tension of the elastic shock cord and folded so as to provide a more compact and portable assembly when not in use. Alternatively, the frame segments may be maintained in their assembled configuration by being screwed together by means of male or female screw threads on the ends of each segment of the support legs being connected together. In addition, the frame segments may be maintained in their assembled configuration by a simple friction fit between each segment of the support legs being connected together. As shown in FIG. 2B, the frame segments 30a, 30b, and 30c may also be maintained in their assembled configuration by means of mechanical hinges 31a and 31b between each support leg segment 30a, 30b and 30c, such that the frame can be folded together without the segments being detached from one another. Any other known means for connecting the segments of the support legs together may be employed. The ends of the support legs 30a and 30c may be plugged with a cap end plug 32a and/or a plug 32b with a connection point 5 extending from the plug.

In another embodiment shown in FIG. 2B, the support legs 2 and 3 comprise folding segments attached with mechanical hinges 31a and 31b. When in use, the support legs are extended. When not in use, the support legs may be folded to a more compact arrangement.

Figure 2C:
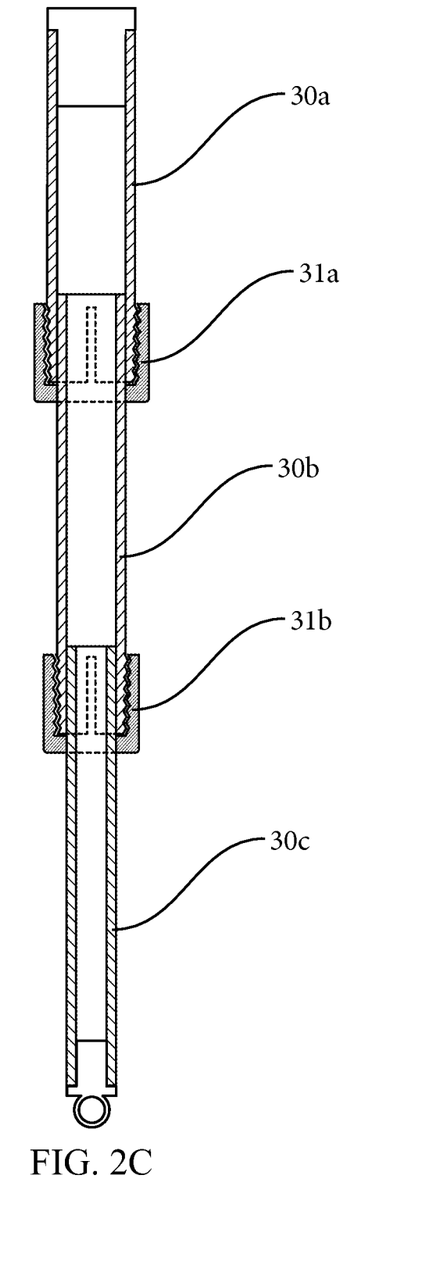
FIG. 2C shows an embodiment of a multi-segmented support leg comprising nesting tubes configured to telescopically extend and retract.

In another embodiment, as shown in FIG. 2C, the support legs 2 and 3 may also be adjustable in length by providing telescopic legs, comprising multiple segments that nest within each other and can be fixed at a desired length by tightening a sleeve that surrounds the leg which when screwed tight causes the legs to be held in place relative to one another through a frictional hold. Alternatively, the nesting telescoping legs can be secured in place by spring-loaded pins.

As described generally above, the support strap 1 is used to connect the lower portions of the two support legs 2 and 3 and to connect at least one of the lower portions of a support leg to a middle or an upper portion of the opposite support leg, wherein the support strap 1 is adjustable in length. The present invention contemplates various configurations of the support strap 1 being connected to the support legs 2 and 3 to permit adjustment of the length of the support strap 1, so as to accommodate various sizes of users and different positions of the user (i.e., standing, sitting, or prone) while using the device or for accommodating various positions of the user. For example, in some embodiments, one or more of the upper and lower portion of the first support leg comprises a connection point, through which a support strap 1 is drawn and slideably connected, so as to allow the first and second support legs 2 and 3 to be spread apart to an optimal angle for resting upon the lap, lower body or chest area of a user 100. As shown in FIG. 1A, one or more of the support legs 2 and 3 may be configured to provide a connection point 5 in one end of the support leg, for example, by providing one or more of end plugs 22a and 22b with a connection point 5 inserted into the end of the support leg tubing, or alternatively by providing a connection point 5 in the end of the support leg 2 or 3 itself, or alternatively by providing a small strap with a connection point that wraps around and is connected to the end of the support leg. The small strap may be an elastic strap that wraps tightly around the end of the support leg and is held in place by a tight frictional fit, and may be connected to itself by any suitable means, such as a hook-and-loop fastener or a snap button. The connection point 5 is conveniently used for drawing the support strap 1 through and allowing the support strap 1 to adjustably slide through during use. The device is configured such that the support strap 1 is adjustable in length. For example, either the bottom portion of the support strap 1 may be adjustable or the top portion of the support strap 1 may be adjustable, or both the top and the bottom portion of the support strap 1 may be adjustable. Provided that the middle portion of the support strap 1 is slideably drawn through a connection point 5 in the second support leg 3, it is generally sufficient to have one of the top or the bottom portions of the support strap 1 adjustably connected to the first support leg 2. As used herein, the term "bottom portion" of the support strap 1 refers to that portion of the support strap 1 that is connected to the lower portion of the support leg 2. Similarly, the term "middle portion" of the support strap 1 refers to that portion of the support strap 1 that is connected to the lower portion of support leg 3. The term "top portion" of the support strap 1 refers to that portion of the support strap 1 that is connected to the middle or upper portion of support leg 2.

Returning to FIG. 1A, the lower portion of the second support leg 3 has a connection point 5, through which the middle portion of the support strap 1 is slideably drawn through. The middle portion of the first support leg 2 is configured to allow the support strap 1 to be adjustably connected. Alternatively, the support strap 1 may be adjustably connected to the upper or middle portion of the first support leg 2. For example, the middle portion of the first support leg 2 also includes a connection point 6 through which the top portion of the support strap 1 is connected. For example, a suitable connection point may comprise a small strap 6b that wraps around and is connected to the support leg and which includes a hole 6a, such as a grommet through which the support strap can be drawn through. The connection point 6 may be an elastic strap made of such material as rubber, plastic, high density foam rubber, etc., that wraps tightly around the end of the support leg and is held in place by a tight frictional fit, and may be connected to itself by any suitable means, such as by sewing the ends together, a hook-and-loop faster or a snap button. The support strap 1 may, for example, be drawn through the hole 6a and reconnected to the support strap 1 by means of a cord tensioner 8, thus allowing the cord tensioner 8 to be used to adjust the length of the support strap 1. The bottom portion of the support strap 1 is fixedly connected to the lower portion of the first supporting leg 2. Alternatively, the support strap 1 may be adjustably connected to the lower portion of the first support leg 2, with the middle portion of the support strap being slideably drawn through the connection point 5 of the second support leg 3, and the top portion of the support strap 1 fixedly connected to the middle or upper portion of the first support leg 2.

With respect to the hole 6a on the upper portion of the support leg 2, the hole 6a may comprise any suitable structure sufficient to allow the support strap 1 to be connected to the support leg 2 in a slideable manner, sufficient to allow the support strap 1 to be drawn through the connection point 6 and adjusted in length. For example, the connection point 6 may comprise a ring or a donut-shaped grommet 6a that is attached to sleeve 6b that wraps around the support leg 2. In one embodiment, the sleeve is comprised of a material capable of a friction fit to the support leg 2 sufficient for the sleeve to stay in place during use but capable of being manually moved up or down on the support leg 2 to a different position, as necessary to accommodate the size or preference of the user 100.

FIG. 1A shows one possible configuration for connecting the support strap 1 to the articulated bipod frame, where the bottom portion of the support strap 1 is fixedly connected to the lower portion of a first support leg 2, slideably drawn through a connection point 5 in the lower portion of the second support leg 3, and adjustably connected to the middle portion of the first support leg 2.

Figure 1B:
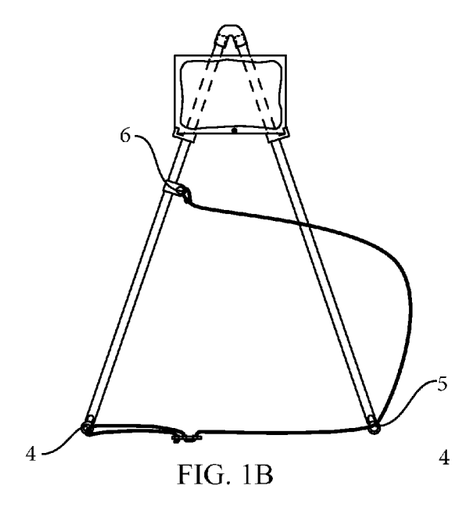
FIG. 1B shows an embodiment where the bottom portion of the support strap is adjustably connected to the lower portion of a first support leg, the middle portion of the support strap is slideably drawn through a connection point in the lower portion of the second support leg, and the top portion of the support strap is fixedly connected to the middle portion of the first support leg.

In an alternative embodiment, as shown in FIG. 1B, the bottom portion of the support strap 1 is adjustably connected to the lower portion of the first support leg 2, slideably drawn through a connection point 5 in the lower portion of the second support leg 3, and fixedly connected to the middle portion of the first support leg 2.

Figure 1C:
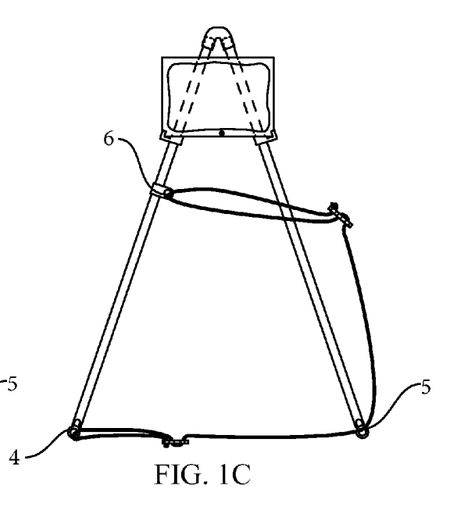
FIG. 1C shows an embodiment where both the top and bottom portions of the support strap are adjustably connected to the middle and lower portion of the other support leg and the middle portion of the support strap is slideably drawn through a connection point in one of the support legs.

In an alternative embodiment, as shown in FIG. 1C, the bottom portion of the support strap 1 is adjustably connected to the lower portion of the first support leg 2, slideably drawn through a connection point 5 in the lower portion of the second support leg 3, and also adjustably connected to the middle portion of the first support leg 2.

Figure 1D:
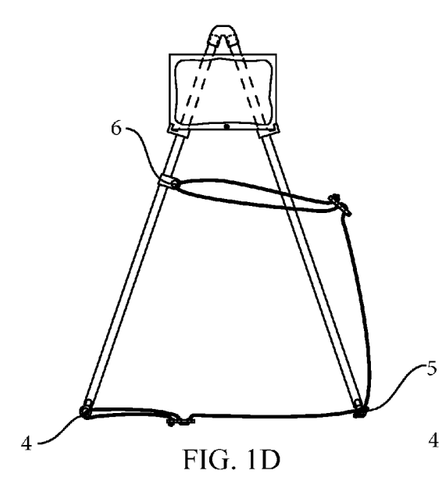
FIG. 1D shows an embodiment where both the top and bottom portions of the support strap are adjustably connected to the middle and lower portion of a first support leg and the middle portion of the support strap is fixed to the lower portion of the second support leg.

In yet another alternative embodiment, as shown in FIG. 1O, the bottom portion of the support strap 1 is adjustably connected to the lower portion of the first support leg 2, fixedly connected to the lower portion of the second support leg 3, and adjustably connected to the middle portion of the first support leg 2.

Figure 1E:
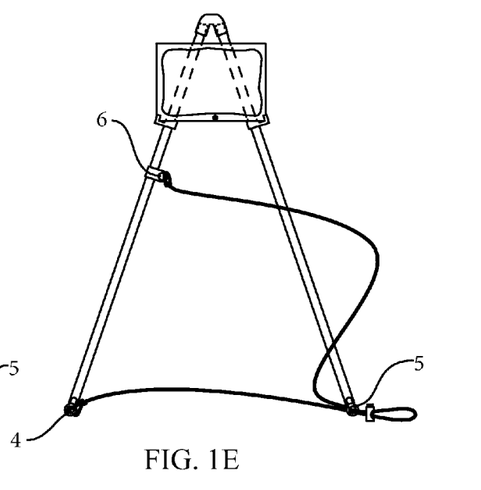
FIG. 1E shows an embodiment where both the top and bottom portions of the support strap are fixedly connected to the top and bottom portions of the first support leg, and the middle portion is looped through a hold in the bottom of the second support leg, with a cord lock around the loop to adjust the length of the strap.

In yet another alternative embodiment, show in FIG. 1E, the bottom portion of the support strap 1 may be fixedly connected to the lower portion of the first support leg 2, adjustably connected to the lower portion of the second support leg 3, and fixedly connected to the middle portion of the first support leg 2, wherein the adjustable connection to the lower portion of the second support leg 3 may comprise, for example, a loop of the support strap being threaded through a connection point 5 in the lower portion of the second support leg 3 and then threaded through a mechanism for adjusting the length of the support strap 1 that is threaded through the connection point 5, such as a barrel cord tensioner.

The support strap 1 may be configured to be adjustable in various ways. For example, as shown in FIG. 1A, a support strap 1 may be adjustably connected to a support leg 2, threaded through a connection point movably mounted to the support leg 2, and then reconnected to itself with a cord tensioner, such as a flat bar cord tension 8 having a hole for the end of the strap, and two holes through which the returning portion of the strap are threaded to create frictional tension and hold the strap adjustment in place. It is understood that the support strap 1 may be adjustable by any number of mechanisms know to those skilled in the art, such as, for example, a retractable reel, a spring-loaded barrel cord lock, magnetic clasps, a ring-tensioner, etc.

When in use, the viewable object 200 is rested upon or affixed to the support legs 2 and 3 of the bipod structure near the flexible hinge mechanism 7. The hinge mechanism 7 connects the support legs 2 and 3 of the bipod structure, enabling a wide-angle degree of freedom. A support strap 1 is affixed to a connection point 4 at or near the end of the lower portion of the support leg 2. The support strap 1 can be any material that has sufficient flexibility and strength including but not limited to: rope, twine, string, cordage, webbing, tape-like materials, and braided or non-braided wire. In the preferred embodiment, the connection points 4 and 5 are a through-hole, ring, slot, loop, clip, or hook attached to or located on the support legs 2 and 3 of the bipod structure.

The device of the present invention may further comprise a support 10 configured to removeably support a viewable object on the frame. A support 10 may comprise, for example, support posts moveably connected to the support legs 2 and 3 of the bipod structure as an option to increase the stability of the viewable object 200 when the invention is in use. The viewable object 200, such as an electronic device or a book, can be rested upon or affixed to the frame by any known support or fastening mechanism, including but not limited to such mechanisms as elastic materials such as rubber bands or other elastic cording, simple posts (optionally combined with, for example, some type of elastic cord to keep the viewable object 200 secured to the frame), L-brackets, clamps, hook and loop fasteners, clips, clamps, hook-and-loop or dual-lock materials, pegs, posts, magnets, suction cups, hooks, and the like. In some embodiments, the support 10 may be moveable, so as to allow the user to make adjustments in the location of the viewable object.

Figure 3A:
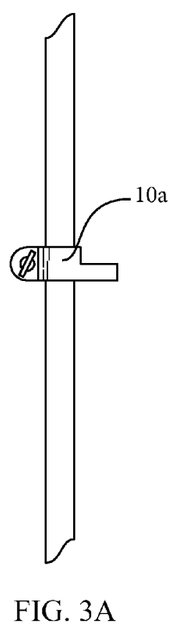
FIG. 3A shows one embodiment of a support for supporting an object on the bipod frame, wherein the support is a simple post.
Figure 3B:
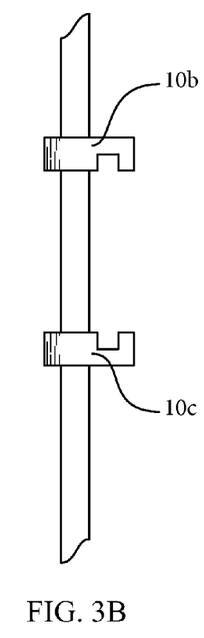
FIG. 3B shows one embodiment of a support for supporting an object on the bipod frame, wherein the support is an L-bracket.
Figure 3C:
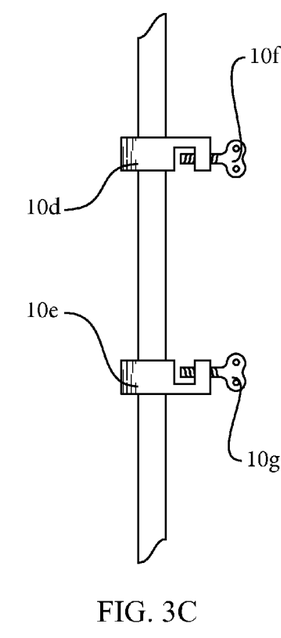
FIG. 3C shows one embodiment of a support for supporting an object on the bipod frame, wherein the support is a clamp having a clamp bolt.
Figure 3D:
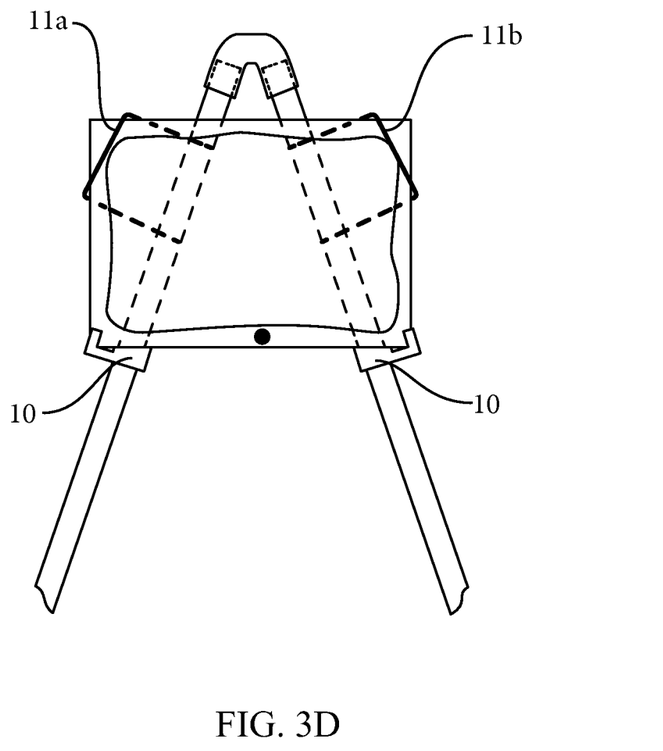
FIG. 3D shows one embodiment of a support for supporting an object on the bipod frame, wherein the clamp is an elastic cord that wraps partially around the viewable object to secure it to the frame.
Figure 4A:
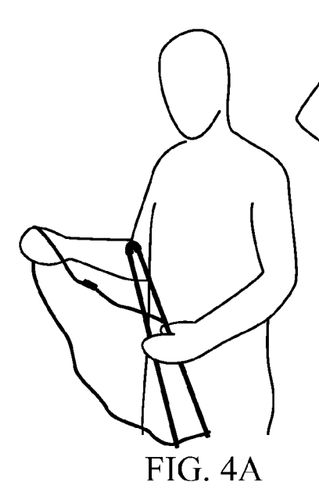
FIGS. 4A through 4F illustrate views of a right-handed user deploying and wearing the device of the present invention.
Figure 4B:
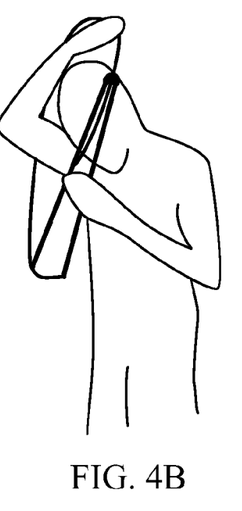
Figure 4C:
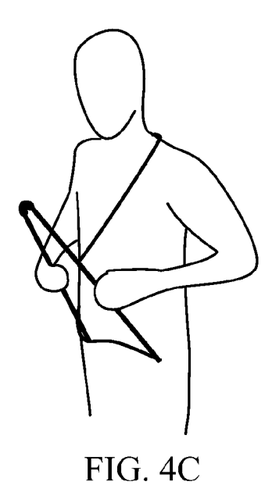
Figure 4D:
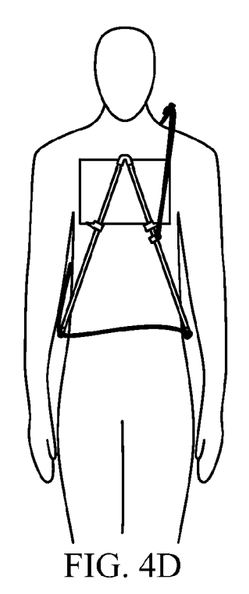
Figure 4E:
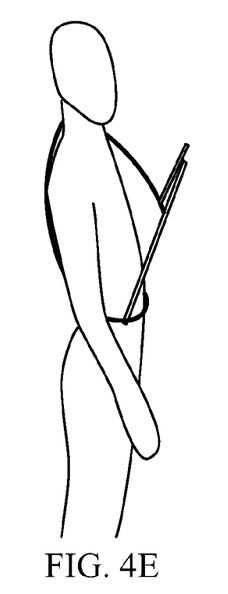
Figure 4F:
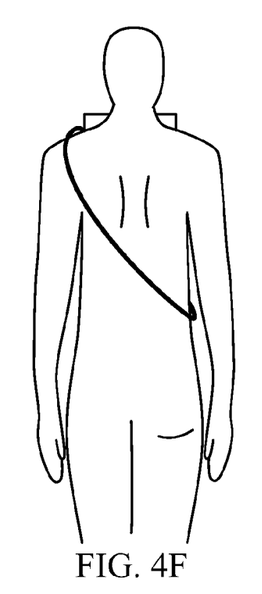

Various configurations of supporting the viewable object 200 on the support legs 2 and 3 are shown in FIGS. 3A-3D. For example, FIG. 3A shows a simple post 10a. FIG. 3B shows a support leg having two L-brackets 10b and 10c which may be movably placed on the top and bottom of a viewable object 200. FIG. 3C shows a support leg having two C-clamps 10d and 10e, which may be moveably placed on the top and bottom of a viewable object 200, and secured by means of one or more threaded butterfly bolts 10f and 10g that can be tightened down on the viewable object 200. FIG. 3D shows elastic cords 11a and 11b which can be secured to one or more support legs 2 and 3 and then wrapped around a corner or other portion of the viewable object 200 to secure it to the support legs 2 and 3.

As illustrated in FIG. 1A, the support strap 1 continues from a connection point 4 on the lower portion of support leg 2 to a connection point 5 at or near the end of the lower portion of support leg 3 and is capable of freely moving/sliding through the connection point 5. The support strap 1 continues from the connection point 5 to another connection point 6, along the middle portion of support leg 2, at which it is adjustably attached. In some embodiments, the connection point 6 is also capable of being repositioned to different locations along the support leg 2, so as to accommodate adjustments for proper fit and ergonomic use. The support strap 1 then continues to where it terminates at a mechanism 8 that enables the user to adjust its overall length. The mechanism 8 can be anything that allows the length of the support strap 1 to be adjusted such as a slip knot (i.e., tautline hitch knot), adjustable strap hardware, cordage tensioners, drawstring stops and retractable reel devices and the like. Some common examples of adjustable tensioners may include but are not limited to: ring tensioners, flat tensioners, crimps, spring-loaded clips, buckles, D-rings, spring-loaded stops, and the like.

Referring now to FIGS. 4A through 4F there are shown one embodiment of the present invention in varying states of being deployed on a right-handed user 100. As shown, the support legs 2 and 3 of the bipod structure are cantilevered from the user 100. The support strap 1 begins where it is affixed to the first support leg 2 at a connection point at the bottom 4 at or near the lower end of the first support leg 2 near the left side of the torso of the user 100. The support strap 1 then continues across the front of the torso of the user 100, wrapping around the right side of the torso of the user 100, and then continues up and across the back of the user 100, where it then wraps back over the left shoulder of the user 100, returning to a connection point 6 having hole 6a through which it can adjustably move. The connection point 6 having hole 6a is capable of moving to various locations along the support leg 2 remaining stationary thus enabling finer adjustments in the pitch of the support legs 2 and 3 of the bipod structure. The support strap 1 continues from the hole 6a in connection point 6 to a tensioning mechanism 8 where it terminates. The tensioning mechanism 8 allows the support strap 1 to be adjustable in length. This feature coupled with the support strap 1 freely moving/sliding through connection point 5, and the hinge mechanism 2 which connects the frame pieces 2 and 3 of the bipod structure, allows the invention to accommodate many different shapes and sizes of users while also enabling the user 100 to adjust the invention to a wide variety of viewing positions in a continuous, fluid-like manner.

Use of the device described herein is shown in FIG. 4. The device is deployed by a user 100 by, for example, initially holding the support legs 2 and 3 of the bipod structure in the user's 100 non-dominant hand with the dominant hand holding the support strap 1. The user 100 then places the support strap 1 up and over their head allowing it to cross their torso and wrap over the shoulder of their non-dominant side. The user 100 then places a hand on each of the support legs 2 and 3 of the bipod structure and pushes the bipod structure away from the front of their body, creating tension in the support strap 1, while simultaneously increasing the angle between the support legs 2 and 3 of the bipod structure. The user 100 then places the lower portions of the support legs 2 and 3 of the bipod structure and the section of support strap 1 between the frame pieces 2 and 3 against their torso in a location that is comfortable and suitable for the intended use. The viewable object 200 is then affixed (if not already affixed) or rested upon the bipod structure. The user 100 can experiment with adjusting the support strap 1 length, location where the lower portion of the support legs 2 and 3 and the section of support strap 1 come into contact with the user's 100 torso, the angle created by the hinge mechanism 7, and the location of the connection point 6 on the support leg 2 to optimize the comfort and utility of the invention. The length of the support legs 2 and 3 can be changed to provide and even further customized fit.

Those skilled in the art will recognize various modifications which could be made to the embodiments disclosed herein without departing from the scope and spirit of the invention.

The following claims are intended to cover such obvious modifications.

The invention claimed is:

1. A wearable adjustable support device for hands-free viewing of an object, such as a hand-held electronic device or book, comprising:
 a frame comprising (i) a first support leg having an upper portion, middle portion, and a lower portion, and (ii) a second support leg having an upper portion and a lower portion, wherein the upper portion of the first support leg is connected to the upper portion of the second support leg, and wherein one or more of the middle/upper and lower portions of the support legs comprises a connection point;
 a support strap connected to the lower portion of the first support leg, the lower portion of the second support leg, and the upper or middle portion of the first support leg, wherein the support strap extends from the lower portion of the first support leg to the lower portion of the second support leg, and wherein the support strap further extends from the lower portion of the second support leh to the upper or middle portion of the first support leg; and
 a support configured to removeably support a viewable object on the frame.

2. The support device of claim 1, wherein the frame is articulated and configured to allow an adjustable angle between the first and second support leg.

3. The support device of claim 1, wherein the frame is a bipod frame.

4. The support device of claim 1, wherein the support strap is adjustable in length.

5. The support device of claim 1, wherein the support strap comprises a bottom portion, a middle portion and a top portion, wherein the support strap is adjustable in length, and wherein
 (i) the bottom portion of the support strap is connected to the lower portion of the first support leg,
 (ii) the middle portion of the support strap is slideably drawn through the second support leg connection point, and
 (iii) the top portion of the support strap is connected to the upper or middle portion of the first support leg, and
wherein one or more of the top portion of the support strap and bottom portion of the support strap is adjustably connected to the first support leg via the connection point.

6. The support device of claim 5, wherein one or more of the top portion of the support strap and bottom portion of the support strap is adjustably connected to the first support leg and the middle portion of the support strap is fixedly connected to the second support leg.

7. The support device of claim 5, wherein both the top portion of the support strap and bottom portion of the support strap is adjustably connected to the first support leg.

8. The support device of claim 5, wherein the first and second support legs are segmented.

9. The support device of claim 8, wherein the first and second support legs comprise folding segments attached with a hinge.

10. The support device of claim 8, wherein the first and second support legs comprise nested segments that are telescopic.

11. The support device of claim 8, wherein the segmented support legs are connected by an internal elastic cord.

12. The support device of claim 5, wherein the position of upper connection point on the first support leg is adjustable.

13. The support device of claim 12, wherein the upper connection point is positioned at the upper or middle portion of the first support leg.

14. The support device of claim 12, wherein the connection point is positioned at the lower portion of the first support leg.

15. The support device of claim 5, wherein the support strap comprises an adjustable strap tensioner configured to adjust the length of the support strap.

16. The support device of claim 15, wherein the support strap is drawn through the connection point on the first support leg and reconnected to the support strap with an adjustable strap tensioner, wherein the adjustable strap tensioner is configured to adjust the length of the support strap.

17. The support device of claim 1, wherein the support strap comprises a bottom portion, a middle portion and a top portion, wherein the support strap is adjustable in length, and wherein
  (i) the bottom portion of the support strap is adjustably connected to the first support leg lower connection point,
  (ii) the middle portion of the support strap is connected to the second support leg, and
  (iii) the top portion of the support strap is adjustably connected to the first support leg upper connection point.

18. The support device of claim 17, wherein the middle portion of the support strap is adjustably connected to the second support leg.

19. The support device of claim 17, wherein the first and second support legs are segmented.

20. The support device of claim 19, wherein the first and second support legs comprise folding segments attached with a hinge.

21. The support device of claim 19, wherein the first and second support legs nested segments that are telescopic.

22. The support device of claim 19, wherein the segmented support legs are connected by an internal elastic cord.

23. The support device of claim 17, wherein the position of upper connection point on the first support leg is adjustable.

24. The support device of claim 23, wherein the support strap is drawn through the upper connection point and reconnected to the support strap with an adjustable strap tensioner, and wherein the support strap is drawn through the lower connection point and reconnected to the support strap with an adjustable strap tensioner, wherein the adjustable strap tensioner at the upper portion and lower portion of the support strap is configured to adjust the length of the support strap.

25. The support device of claim 17, wherein the support strap comprises an adjustable strap tensioner configured to adjust the length of the support strap.

\* \* \* \* \*